July 5, 1949. J. A. ERICKSON 2,475,382
COMBINED MILLING AND CONVEYING APPARATUS
Filed Feb. 13, 1946
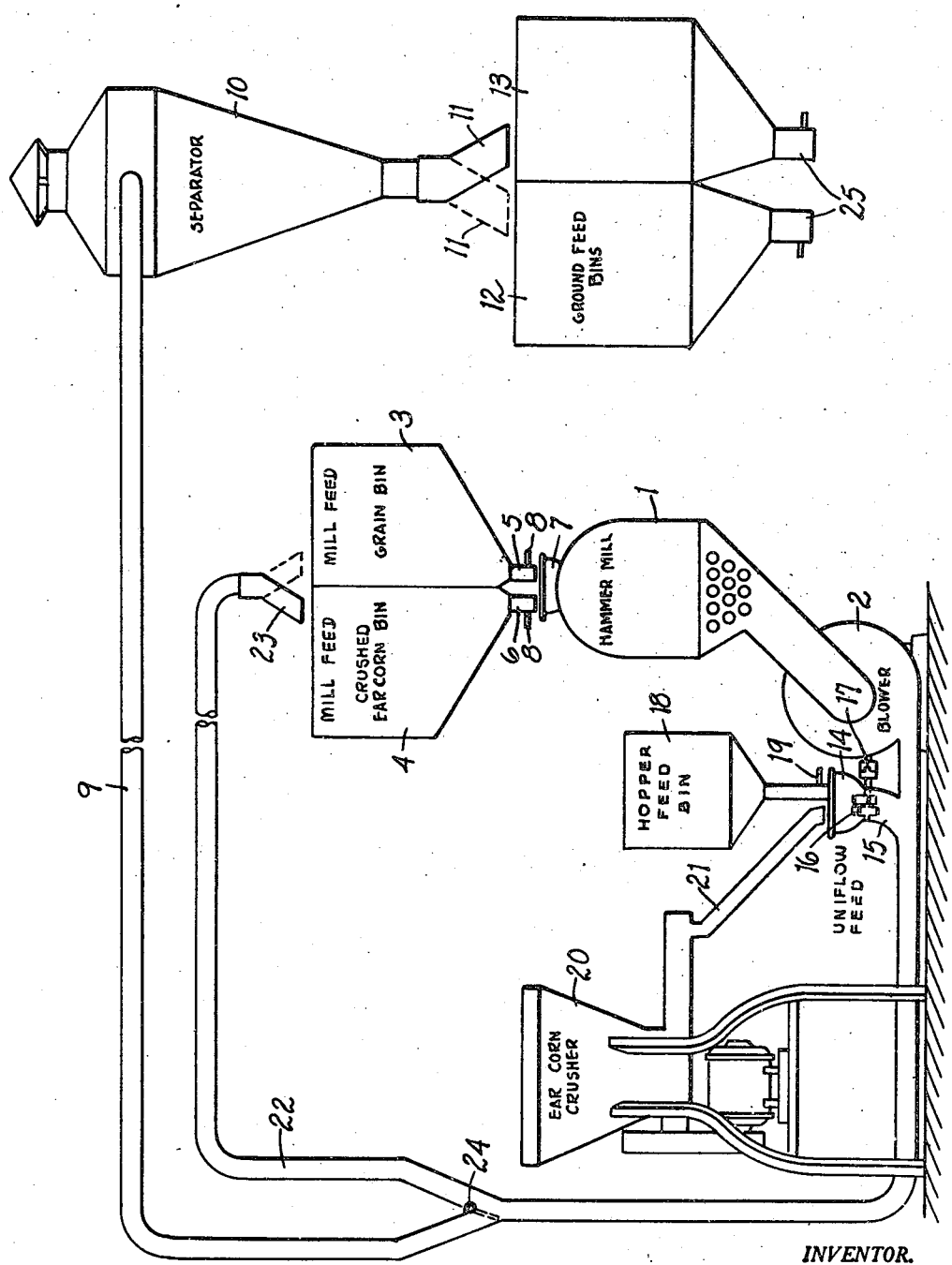
INVENTOR.
JOHN A. ERICKSON
BY
ATTORNEY Patented July 5, 1949

2,475,382

UNITED STATES PATENT OFFICE 2,475,382

COMBINED MILLING AND CONVEYING APPARATUS

John A. Erickson, Manhattan, Kans.

Application February 13, 1946, Serial No. 647,369

5 Claims. (Cl. 241—61)

This invention relates to improvements in combined milling and conveying apparatus.

The main objects of this invention are:

First, to provide a mill and conveying apparatus which is well adapted for domestic use, that is used by dairymen and farmers, which is simple and economical in structure and installation and efficient in the handling of grain and the delivery of the ground grain or feed at the desired point.

Second, to provide a mill and conveying apparatus of this character which is adapted to elevate grain or crushed corn, chopped hay or other chopped forage into overhead bins so that it will feed by gravity to the grinder or mill.

Third, to provide an apparatus having these advantages which is quite compact and simple and economical in its parts.

Objects relating to details and economies of the invention will appear from the description to follow. The invention is defined and pointed out in the claims.

A structure which embodies the features of the invention is clearly illustrated in the accompanying drawing, in which:

The drawing is a view mainly diagrammatic showing the parts conventionally.

In the accompanying drawing 1 represents a mill or grinder, desirably a hammer mill provided with a discharge blower 2. In the embodiment illustrated, the grain feed bin 3 and the crushed ear corn bin 4 are provided with spouts 5 and 6, both delivering to the hopper 7 of the mill. Feed valves are conventionally shown at 8. Bins discharge by gravity to the mill.

The main conveyor 9 is connected to and constitutes the discharge for the blower. This main conveyor is, in the embodiment illustrated, connected to deliver to the separator 10 conventionally illustrated, the separator being provided with a discharge spout 11 adjustable to deliver to either of the ground feed bins 12 and 13 as is illustrated by the dotted lines and the full lines.

The conveyor feed hopper 14 is connected by the chute 15 to deliver to the main elevating conveyor conduit at the rear of the blower. This feed hopper is provided with a force feed and feed regulator means at 16 and connected to be driven by the blower or the blower driving means, the driving connections being conventionally shown at 17. The hopper feed grain bin 18 delivers by gravity to the feed hopper 14 and is provided with a regulating valve 19 shown conventionally.

The ear corn crusher and shredder 20 delivers through the discharge spout 21 to the hopper 14. In normal operation the grain is fed to the hopper from the hopper feed bin 18 or the ear corn crusher and shredder 20 is operated. This combined ear corn crusher or shredder shells the corn and shreds the cobs, and the combined shredded cob and shelled corn are delivered to the hopper 14.

The grain discharged to the hopper from the grain bin 18 or the shelled and shredded cob material may be delivered to the bins 3 and 4 through the branch conveyor pipe 22 which is connected to the conveyor pipe or conduit 9 at the rear of the feed hopper 14.

The branch 22 is provided with an adjustable spout 23 which may be adjusted to deliver to either bin 3 or 4. The valve or gate 24 may be adjusted to deliver the material through the branch or through the main conveyor conduit beyond the branch into the separator 10.

Ordinarily the ground feed is desired for use at considerable distance from the mill or grinding machine, and it is also desirable that the ground feed bins be in an elevated position so that the ground material may be withdrawn therefrom as through the spouts 25.

I have not in the accompanying drawing attempted to illustrate the relative position of the ground feed bins with other parts of the mechanism, except that the feed is supplied to the ground feed bins through the conveyor conduit. It will also be appreciated that I have not attempted to illustrate parts in relative size or dimension.

The whole grain is delivered to the conveyor through the hopper 14 at the rear of the blower so that the grain is not subject to the impact of the fan wheel such as results where the grain is introduced in advance of the blower. Broken or cracked grains rapidly deteriorate. The grain is delivered through the forced feed regulator means 16 in the desired amount to flow through the conducting conduit without breakage or tension, and the flow of grain through the air stream being controlled, the correct amount is fed into the stream, preventing clogging and waste of power in the event of an inefficiently small amount of grain being delivered to the conveyor.

Also the shredded cob and corn mixture delivered from the machine designated or corn crusher is fed in desired amounts, that is in an amount which the apparatus will effectively handle and is delivered to the bins for the mill.

Sometimes it is desired to grind whole grain, and in that event the grain is placed in the hopper feed bin 18 and is conveyed through the branch conduit to the mill feed grain bin. At other times it is desirable to mill the corn and crushed cob and it is delivered to bin 4.

It will be understood that the designation of bins is entirely arbitrary.

After the material to be ground has been elevated into the grinder feed bins the valve or gate 24 is adjusted to close the branch conduit 22 and the mill supplied with the material to be ground which is conveyed by the blower through the main conveyor conduit to the separator, where a separator is present, and delivered from the separator into the desired ground feed bin, one being commonly used for the ground feed containing the cob and the other for the whole grain.

While the legends on the drawing refer to grain, it should be noted that for some purposes chopped hay or other fodder is milled or ground and in that event it is supplied to the hopper 14 so as to be fed through the feed regulating means in the desired quantity to prevent plugging, and also to provide an economical supply, that is an amount which can be effectively conveyed through the conveyor. The ground hay or forage is delivered into the feed bins and then to the mill and can be translated to the desired point through the main delivery conduit 9.

My apparatus is efficient and handles material with a minimum of lifting and labor on the part of the operator. While the parts are shown conventionally and the apparatus is illustrated diagrammatically, it is believed that the disclosure is such as to enable those skilled in the art to embody or adapt my invention as may be desired.

Having thus described my invention, what I claim as new and desire to secure by Letters Patent is:

1. An apparatus of the class described comprising a mill provided with a discharge blower, grain and crushed ear-corn mill supply bins positioned to feed by gravity to said mill, a main elevating conveyor conduit to which said blower delivers, a supply hopper for said main conveyor conduit provided with a forced delivery means and disposed to deliver to said main conveyor conduit on the discharge side of said blower and having driving connection with the blower, a hopper supply bin having gravity discharge connection to said supply hopper, an ear-corn crusher having discharge connection to said supply hopper, a separator to which said main conveyor delivers, said separator having an adjustable discharge spout, ground feed bins associated with said separator spout to selectively receive the ground feed discharged therefrom, a branch conveyor conduit connected to said main conveyor conduit between said supply hopper and said separator and having a terminal discharge spout adjustable to discharge either to the crushed ear-corn bin or to the grain bin, and a valve arranged at the point of connection of the branch conveyor to the main conveyor and adjustable to direct the material through the main conveyor to the separator or through said branch conveyor to the mill supply bins.

2. An apparatus of the class described comprising a mill provided with a discharge blower, grain and crushed ear-corn mill supply bins positioned to feed by gravity to said mill, a main elevating conveyor conduit to which said blower delivers, a supply hopper for said main conveyor conduit provided with a forced delivery means and disposed to deliver to said main conveyor conduit on the discharge side of said blower and having driving connection with the blower, a hopper supply bin having gravity discharge connection to said supply hopper, an ear-corn crusher having discharge connection to said supply hopper, a branch conveyor conduit connected to said main conveyor conduit between said supply hopper and the end of said main conduit and having a terminal discharge spout adjustable to discharge either to the crushed ear-corn bin or to the grain bin, and a valve arranged at the point of connection for the branch conveyor to the main conveyor and adjustable to direct the material through the main conveyor or through the branch conveyor to the mill supply bins.

3. An apparatus of the class described comprising a mill provided with a discharge blower, a supply bin for said mill, a main elevating conveyor conduit to which said blower delivers, a supply hopper for said main conveyor conduit provided with a delivery regulating means and disposed to deliver to said main conveyor conduit on the discharge side of said blower, a hopper supply bin having a delivery connection to said supply hopper, an ear-corn crusher having a delivery connection to said supply hopper, a separator to which said main conveyor delivers, a ground feed bin associated with said separator, a branch conveyor conduit connected to said main conveyor conduit between said supply hopper and said separator and delivering to said supply bin for said mill, and a valve for directing the conveyed material through the branch conveyor or through the main conveyor beyond the branch conveyor.

4. An apparatus of the class described comprising a mill provided with a discharge blower, a supply bin for said mill, a main elevating conveyor conduit to which said blower delivers, a supply hopper for said main conveyor conduit provided with a delivery regulating means and disposed to deliver to said main conveyor conduit on the discharge side of said blower, a hopper supply bin having a delivery connection to said supply hopper, an ear-corn crusher having a delivery connection to said supply hopper, a ground feed bin to which said main conveyor conduit delivers, a branch conveyor conduit connected to said main conveyor conduit between said supply hopper and said ground feed bin and delivering to said supply bin for said mill, and a valve for directing the conveyed material through the branch conveyor or through the main conveyor beyond the branch conveyor.

5. An apparatus of the class described comprising a mill, grain and crushed ear-corn, supply bins for said mill, a blower operatively associated with said mill, a main elevating conveyor conduit to which said blower delivers, a grain supply hopper for said main conveyor disposed to deliver thereto on the discharge of the blower and provided with a forced-delivery regulating means, a hopper supply bin having a delivery connection to said supply hopper, an ear-corn crusher having discharge connection to said hopper, ground feed bins, a separator to which said main conveyor delivers provided with a spout adjustably associated with said ground feed bins, a branch conveyor conduit connected to said main conveyor conduit between said supply hopper and said separator and having a terminal spout adjustable to deliver to either the crushed ear-corn mill supply bin or to the grain mill supply bin, and a valve for directing the material through the main conveyor to the separator or through the branch conveyor to the mill supply bins.

JOHN A. ERICKSON.

REFERENCES CITED

The following references are of record in the file of this patent:

UNITED STATES PATENTS

| Number | Name | Date |
| --- | --- | --- |
| 245,584 | Toulmin | Aug. 9, 1881 |
| 503,357 | Rich | Aug. 15, 1893 |
| 1,199,621 | Sheppard | Sept. 26, 1916 |
| 1,547,491 | Barthelmess | July 28, 1925 |
| 1,609,299 | Kennedy | Dec. 7, 1926 |
| 2,149,289 | Hall | Mar. 7, 1939 |
| 2,181,397 | Everett | Nov. 28, 1939 |
| 2,217,568 | Shirley | Oct. 8, 1940 |
| 2,259,967 | Jorgensen | Oct. 21, 1941 |
| 2,400,382 | Arnold | July 29, 1943 |